United States Patent
Choi et al.

(10) Patent No.: US 8,638,887 B1
(45) Date of Patent: *Jan. 28, 2014

(54) MULTI-STREAM DEMODULATION SCHEME USING MULTIPLE DETECTORS

(71) Applicant: Marvell International Ltd., Hamilton (BM)

(72) Inventors: Jiwoong Choi, Mountain View, CA (US); Jungwon Lee, Cupertino, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,781

(22) Filed: Jan. 7, 2013

Related U.S. Application Data

(63) Continuation of application No. 12/562,687, filed on Sep. 18, 2009, now Pat. No. 8,351,549.

(60) Provisional application No. 61/102,163, filed on Oct. 2, 2008.

(51) Int. Cl.
*H04L 27/06* (2006.01)
*H04L 27/28* (2006.01)

(52) U.S. Cl.
USPC .......................................... 375/341; 375/260

(58) Field of Classification Search
USPC ......... 375/341, 130, 150, 260, 267, 346, 347, 375/349; 370/328, 329, 332; 455/62
See application file for complete search history.

(56) References Cited

U.S. PATENT DOCUMENTS

| | | | |
|---|---|---|---|
| 8,054,909 B2 | 11/2011 | Bahng et al. | |
| 8,073,069 B2 | 12/2011 | Mundarath et al. | |
| 8,351,549 B1 * | 1/2013 | Choi et al. | 375/341 |
| 8,401,127 B1 * | 3/2013 | Lee et al. | 375/341 |

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

(Continued)

*Primary Examiner* — Khai Tran

(57) ABSTRACT

In a method of demodulating a signal transmitted via a multiple input multiple output (MIMO) communication channel, a data symbol vector is received, the data symbol vector including a plurality of data symbols that are received via a plurality of antennas. The received data symbol vector corresponds to a transmitted data symbol vector including a plurality of transmitted data symbols. A plurality of candidate vectors are generated for the transmitted data symbol vector, the plurality of candidate vectors being less than all possible vectors for the transmitted data symbol vector. One candidate vector is selected from the plurality of candidate vectors such that the one candidate vector minimizes a distance value corresponding to a Euclidean distance between the received data symbol vector and a channel estimate matrix multiplied with the candidate vector.

28 Claims, 6 Drawing Sheets

(56) References Cited

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

IEEE Std 802.16-2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.*, Oct. 1, 2004; 893 pages.

Lee et al., U.S. Appl. No. 12/469,382, filed May 20, 2009.

Office Action in U.S. Appl. No. 12/469,382, dated Jun. 8, 2012.

"IEEE P802.11N™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

IEEE P802.16Rev2/D5 (Jul. 2008) (Revision of IEEE Std 802.16-2004 and consolidates material from IEEE Std 802.16e-2005, Std 802.16-2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, Jun. 2008.

* cited by examiner

MULTI-STREAM DEMODULATION SCHEME USING MULTIPLE DETECTORS

CROSS REFERENCE TO RELATED APPLICATIONS

The present application is a continuation of U.S. patent application Ser. No. 12/562,687, now U.S. Pat. No. 8,351, 549, entitled "Multi-Stream Demodulation Scheme Using Multiple Detectors," filed on Sep. 18, 2009, which claims the benefit of U.S. Provisional Patent Application No. 61/102, 163, entitled "Near-ML MIMO Hard Demodulation Based on Multiple Candidates from Heterogeneous Detectors," filed on Oct. 2, 2008. The disclosures of both of the above-identified applications are hereby expressly incorporated by reference herein in their entireties.

FIELD OF TECHNOLOGY

The present disclosure relates generally to multi-antenna wireless systems and, more particularly, to a multi-stream demodulation.

BACKGROUND

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11g (2003), and the IEEE Standard 802.11n now in the process of being adopted, all of which are collectively incorporated herein fully by reference. These standards have been or are in the process of being commercialized with the promise of 54 Mbps or higher data rate, making them a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" standards as well as the IEEE 802.11n standard achieve their high data transmission rates using Orthogonal Frequency Division Multiplexing (OFDM) encoded symbols. Generally speaking, the use of OFDM divides the overall system bandwidth into a number of frequency sub-bands or channels, with each frequency sub-band being associated with a respective sub-carrier. Data upon each sub-carrier may be modulated with a modulation scheme such as QAM, phase shift keying, etc. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the 802.16 IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16 IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconversion, conventional analog to digital conversion and Fast Fourier Transformation of the received time domain analog signal. Thereafter, the baseband processor performs frequency domain equalization (FEQ) and demodulation to recover the transmitted symbols. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

To further increase the number of signals which may be propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n IEEE Standard now being adopted. Various other standards and projects, such as the 802.16 standard, or WiMAX, and Long Term Evolution (LTE project), etc., support MIMO techniques. Generally speaking, the use of MIMO technology produces significant increases in spectral efficiency and link reliability of IEEE 802.11, IEEE 802.16, and other systems, and these benefits generally increase as the number of transmit and receive antennas within the MIMO system increases.

In addition to the frequency sub-channels created by the use of OFDM, a MIMO channel formed by the various transmit and receive antennas between a particular transmitter and a particular receiver may include a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

The transmitters and receivers in the wireless communication system may each be capable of using a variety of modulation schemes. For example, some modulations schemes may provide a higher bit rate than other schemes (e.g., 64-QAM vs. 16-QAM). Typically, modulation schemes that provide a higher bit rate may be more sensitive to channel impairments, such as noise, as compared to modulation schemes with a lower bit rate.

Different modulation/demodulation schemes have various degrees of complexity, and complexity of a given demodulation technique may affect the complexity of a receiver. Higher complexity of a demodulation technique generally requires more complexity on the receiver, e.g., more, larger, and/or more expensive processing modules and/or components. Higher complexity of a demodulation technique may also lead to an increase in processing time.

SUMMARY

The present disclosure describes methods and apparatus for demodulating a signal transmitted via a multiple input multiple output (MIMO) communication channel.

In one embodiment, a method of demodulating a signal transmitted via a multiple input multiple output (MIMO) communication channel includes receiving a data symbol vector comprising a plurality of data symbols that are received via a plurality of antennas, wherein the received data symbol vector corresponds to a transmitted data symbol vector comprising a plurality of transmitted data symbols. The method also includes generating a plurality of candidate vectors for the transmitted data symbol vector, wherein the plurality of candidate vectors are less than all possible vectors for the transmitted data symbol vector. The method further includes selecting one candidate vector from the plurality of candidate vectors such that the one candidate vector minimizes a distance value corresponding to a Euclidean distance between the received data symbol vector and a channel estimate matrix multiplied with the candidate vector.

In another embodiment, another method of demodulating a signal transmitted via a MIMO communication channel includes receiving a data symbol vector y comprising a plurality of data symbols that are received via a plurality of antennas, wherein the received data symbol vector y corresponds to a transmitted data symbol vector x comprising a plurality of transmitted data symbols. Additionally, the method includes generating a plurality of candidate vectors for a first group of data symbols in the transmitted data symbol vector, wherein the plurality of candidate vectors are less than all possible vectors for the first group of data symbols in the transmitted data symbol vector. The method also includes selecting one candidate vector from the plurality of candidate vectors such that the one candidate vector minimizes a distance value corresponding to a Euclidean distance between the received data symbol vector y and a channel estimate matrix multiplied with the candidate vector. The method further includes calculating likelihood values for data symbols in a second group of transmitted data symbols in the transmitted data symbol vector using a soft maximum-likelihood (ML) technique based on the selected candidate vector, wherein the first group does not overlap with the second group.

In yet another embodiment, a device for demodulating a signal transmitted via a MIMO communication channel comprises a multi-stream demodulator configured to demodulate a received data symbol vector comprising a plurality of data symbols received via a plurality of antennas, wherein the received data symbol vector corresponds to a transmitted data symbol vector. The multi-stream demodulator includes (i) at least one detector configured to generate a plurality of candidate vectors for the transmitted data symbol vector, wherein the plurality of candidate vectors are less than all possible vectors for the transmitted data symbol vector, and (ii) a minimum-distance selector configured to select one candidate vector from the plurality of candidate vectors such that the one candidate vector minimizes a distance value corresponding to a Euclidean distance between the received data symbol vector and a channel estimate matrix multiplied with the candidate vector.

In still another embodiment, another device for demodulating a signal transmitted via a MIMO communication channel comprises a multi-stream demodulator configured to demodulate a received data symbol vector comprising a plurality of data symbols received via a plurality of antennas, wherein the received data symbol vector corresponds to a transmitted data symbol vector. The multi-stream demodulator includes (i) at least one detector configured to generate a plurality of candidate vectors for a first group of data symbols in the transmitted data symbol vector, wherein the plurality of candidate vectors are less than all possible vectors for the first group of data symbols in the transmitted data symbol vector, and (ii) a minimum-distance selector configured to select one candidate vector from the plurality of candidate vectors such that the one candidate vector minimizes a distance value corresponding to a Euclidean distance between the received data symbol vector and a channel estimate matrix multiplied with the candidate vector. The multi-stream demodulator is configured to calculate likelihood values for data symbols in a second group of transmitted data symbols in the transmitted data symbol vector using a soft maximum-likelihood (ML) technique based on the selected candidate vector, wherein the first group does not overlap with the second group.

BRIEF DESCRIPTION OF THE DRAWINGS

Like reference numbers and designations in the various drawings indicate like elements. Furthermore, when individual elements are designated by references numbers in the form Nn, these elements may be referred to in the collective by N. For example, FIGS. 2A and 2B illustrate transmitting devices 200a and 200b that may be referred to collectively as transmitting device(s) 200.

DETAILED DESCRIPTION

Figure 1:
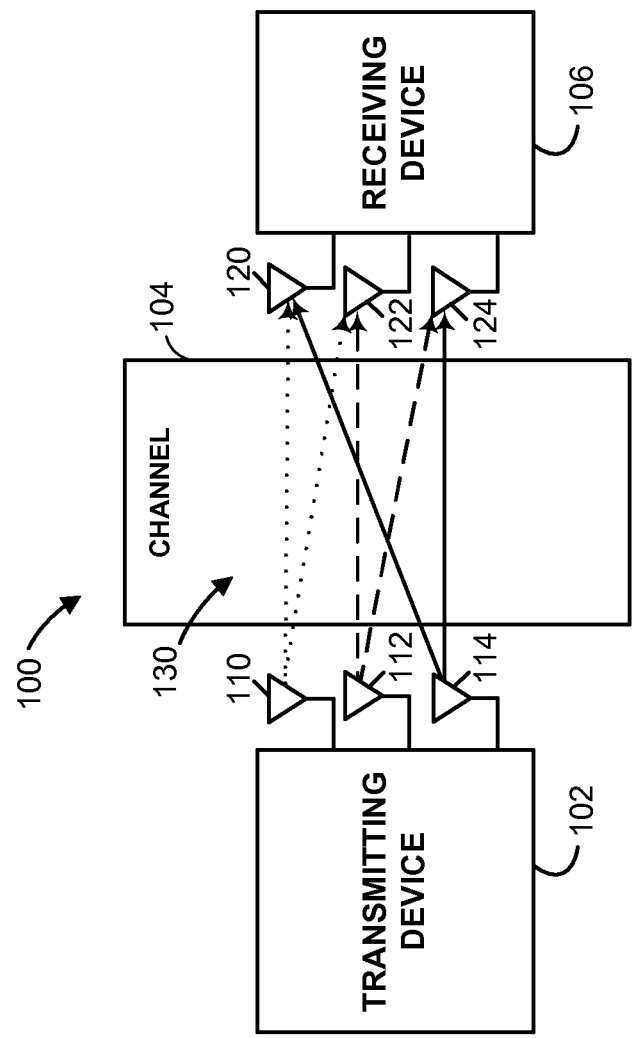
FIG. 1 is a block diagram of an example wireless communication system.

FIG. 1 is a block diagram of an example wireless communication system 100 in which multiple devices, e.g., a transmitting device 102 and a receiving device 106 may communicate with each other via a shared wireless communication channel 104. Each of the devices 102 and 106 may be, for example, a stationary device, such as a base station, or a mobile station equipped with a set of antennas 110-114 and 120-124, respectively. Although the wireless communication system 100 illustrated in FIG. 1 includes two devices, the wireless communication system 100 may, of course, include any number of devices, each equipped with the same or a different number of antennas (e.g., 1, 2, 3, 4 antennas and so on).

Furthermore, although the wireless communication system 100 illustrated in FIG. 1 includes a transmitting device 102 and a receiving device 106, devices in the wireless communication system 100 may generally operate in multiple modes (e.g., a transmit mode and a receive mode). For example, if a given device is a mobile station in a WiMAX communication network or a lap top computer having an IEEE Standard 802.11n compliant wireless transceiver, the device may operate in both a transmit mode and a receive mode. Accordingly, in some embodiments, antennas 110-114 and 120-124 may support both transmission and reception. Alternatively, or additionally, a given device may include separate transmit antennas and separate receive antennas.

Different numbers of spatial streams 130 may be transmitted between the antennas 110-114 and 120-124 in various embodiments and/or configurations of the transmitting device 102 and/or the receiving device 106. Typically, the number S of spatial streams 130 associated with a shared communication channel 104 is less than or equal to minimum of the number $N_T$ of transmit antennas 110-114 and the number $N_R$ of receive antennas 120-124 (i.e., S=min($N_T,N_R$)). The streams 130 may be defined in a variety of ways, e.g., according to various multiple-input and multiple-output (MIMO) modes or schemes, including those known in the art. For example, the transmitting device 102 may use the antennas 110-114 to improve channel diversity by transmitting multiple copies of the same symbol via several streams. Alternatively, the transmitting device 102 may transmit different symbols via each of the antennas 110-114 to increase throughput. As yet another alternative, the transmitting device 102 may operate in a mixed MIMO mode to improve both channel diversity and throughput.

The transmitting device 102 and the receiving device 106 may communicate using a single frequency or multiple frequencies. When the transmitting device 102 and the receiving device 106 communicate using multiple frequencies, the communication channel 104 may include multiple carriers or subcarriers, each associated with a particular frequency at which the devices 102 and 106 may communicate. In some embodiments, the wireless communication system 100 may use an OFDM technique, and the subcarriers may be selected to be mutually orthogonal (i.e., to minimize cross-talk between each pair of subcarriers). However, the wireless communication system 100 could also use any other frequency division multiplexing technique.

The receiving device 106 may be configured to perform a multi-stream demodulation techniques to be described in more detail below. However, before describing the multi-stream demodulation techniques in detail, it is helpful to briefly explain how example signals may be modulated.

Figure 2A:
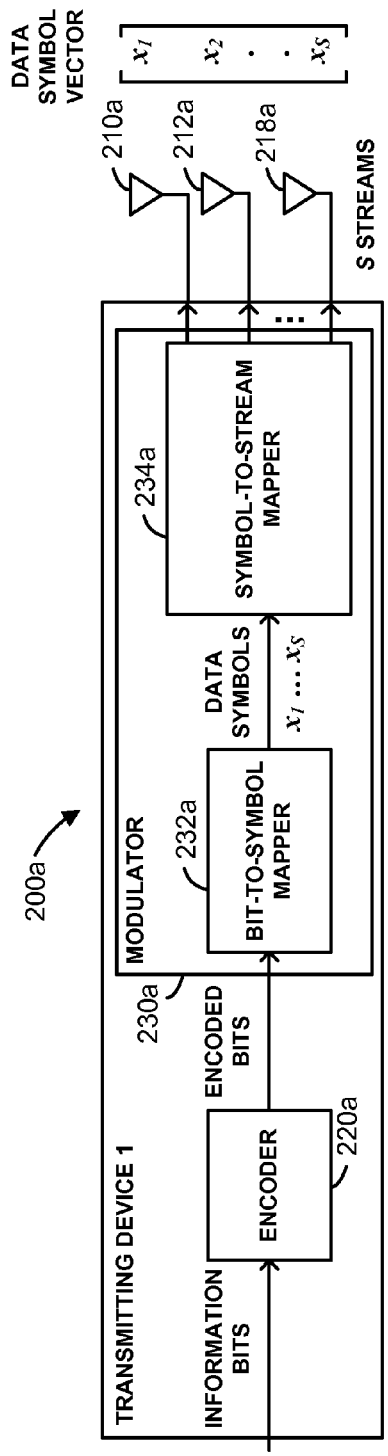
FIG. 2A is a block diagram of an example transmitting device.
Figure 2B:
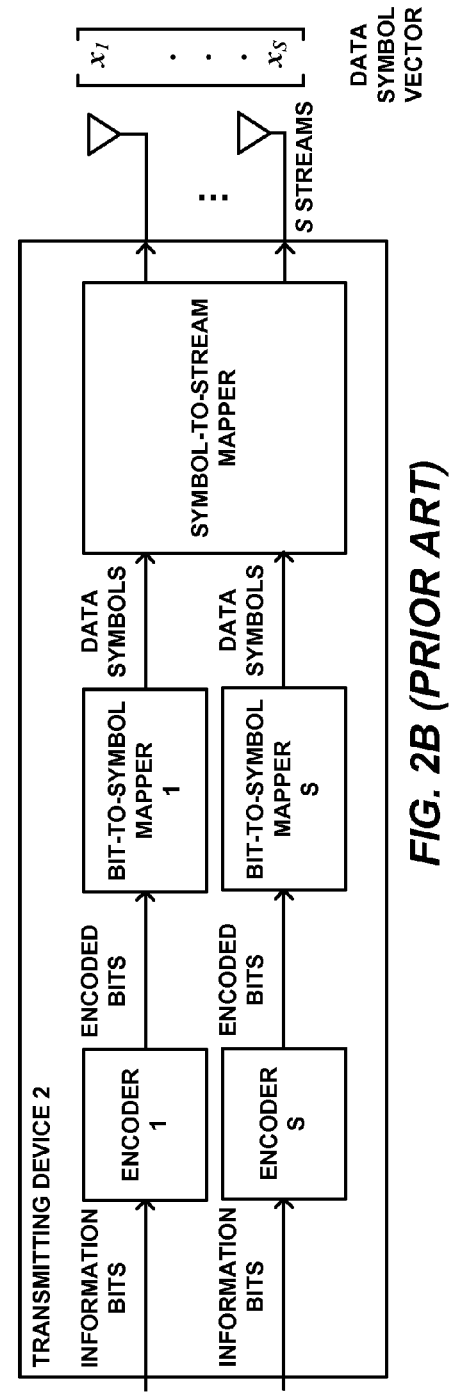
FIG. 2B is a block diagram of another example transmitting device.

FIGS. 2A-2B are block diagrams of example transmitting devices 200. The transmitting devices 200a,b may be utilized in the wireless communication system 100 as the transmitting device 102, for example. It will be understood, however, that the wireless communication system 100 may alternatively use other types of transmitting devices.

Referring to FIG. 2A, the transmitting device 200a may generally convert a sequence of information bits into signals appropriate for transmission through a wireless channel (e.g., channel 104). More specifically, the transmitting device 200a may include an encoder 220a (e.g., a convolution encoder) that encodes information bits, and a modulator 230a that modulates the encoded bits into data symbols, which are mapped and converted to signals appropriate for transmission via transmit antennas 210a-218a. The transmitting device 200a may include various additional modules that, for ease of explanation, are not shown in FIG. 2A. For example, the transmitting device 200a may include an interleaver that interleaves the encoded bits to mitigate burst errors. The transmitting device 200a may further include an analog radio frequency (RF) front end for performing frequency upconversion, various filters, power amplifiers, and so on.

The modulator 230a may include a bit-to-symbol mapper 232a that maps encoded bits into multiple data symbols, and a symbol-to-stream mapper 234a that maps the multiple data symbols into multiple parallel data streams. For example, the modulator 230a may generate S parallel data streams that may be represented by a data symbol vector $x=[x_1, x_2, \ldots, x_s]$, and each individual symbol $x_s$ in the data symbol vector x may be a symbol representative of W bits ($b_{s,1}, b_{s,2}, \ldots, b_{s,W}$).

For ease of explanation, in the examples presented herein, streams and symbols have a one-to-one correspondence. That is, a single stream is associated with a single symbol and vice versa. Accordingly, the words "streams" and "symbols" may be used interchangeably. However, it should be understood that a given stream, for example, may have a number of associated symbols and vice versa. Also, in some embodiments, the same symbol may be transmitted on multiple streams.

Figures 3A, 3B:
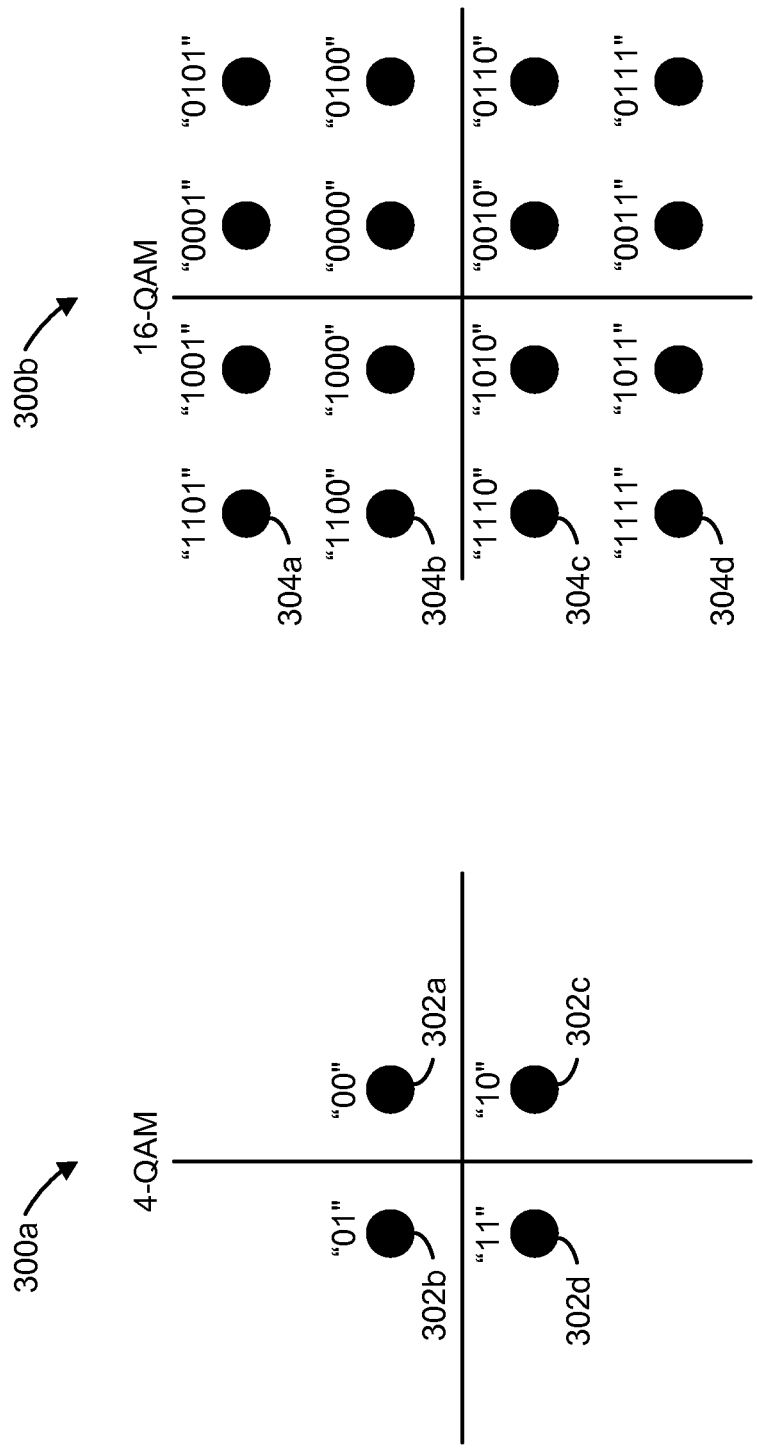
FIG. 3A is an example constellation set for a 4-QAM scheme.
FIG. 3B is an example constellation set for a 16-QAM scheme.

In some embodiments, the modulator 230a may use QAM to map bits to symbols in a QAM signal constellation set, where the symbols are differentiated from one another by phase and/or magnitude. For example, FIG. 3A illustrates a 4-QAM constellation set 300a in an in phase (I) and quadrature phase (Q) plane. In this case, constellation points 302a-302d are distinguishable only by phase. Each constellation point 302 represents a different two-bit symbol: 302a may represent "00," 302b may represent "01," 302c may represent "10," and 302d may represent "11." However, other bit to symbol mappings may be utilized.

Similarly, FIG. 3B illustrates a 16-QAM constellation set 300b, where four-bit sequences correspond to symbols. Here, both the amplitude and the phase of constellation points 304 may vary. FIG. 3B illustrates a mapping, where each constellation point 304 represents a different four-bit symbol: 304a may represent "1101," 304b may represent "1100," 304c may represent "1110," 304d may represent "1111," and so on. However, as discussed in reference to FIG. 3B, other mappings may be utilized.

In general, a W-bit symbol $x_s$ may be mapped according to an M-QAM signal set, where $M=2^W$. Thus, as illustrated in FIG. 3A, if the modulator 230a uses the 4-QAM modulation scheme, or a quadrature phase-shift keying (QPSK) modulation scheme, the modulator 230a will have a signal alphabet size of $M=2^2=4$ (i.e., 4 constellation points), and will map 2-bit pairs into the 4 constellation points. If the modulator 230a uses a 64-QAM scheme, the modulator 230a will have an alphabet size of $M=2^6=64$ (i.e., 64 constellation points) and will map 6-bit segments into the 64 constellation points.

It should be noted that although the transmitting device 200a described with reference to FIG. 2A includes a common encoder chain (an encoder 220a, an interleaver (not shown), a modulator 230a, etc.), a transmitting device 200 may include different encoder chains for different streams. For example, as illustrated in FIG. 2B, each stream generated by the transmitting device 200b may correspond to a separate encoder chain. Other transmitting devices, such as those supporting the WiMAX standards, for example, may support both a single-encoder option and a two-encoder option for a two-transmit-antenna configuration. In general, the number of encoders and/or encoder chains may be less than or equal to the number of transmitted streams S.

Figure 4:
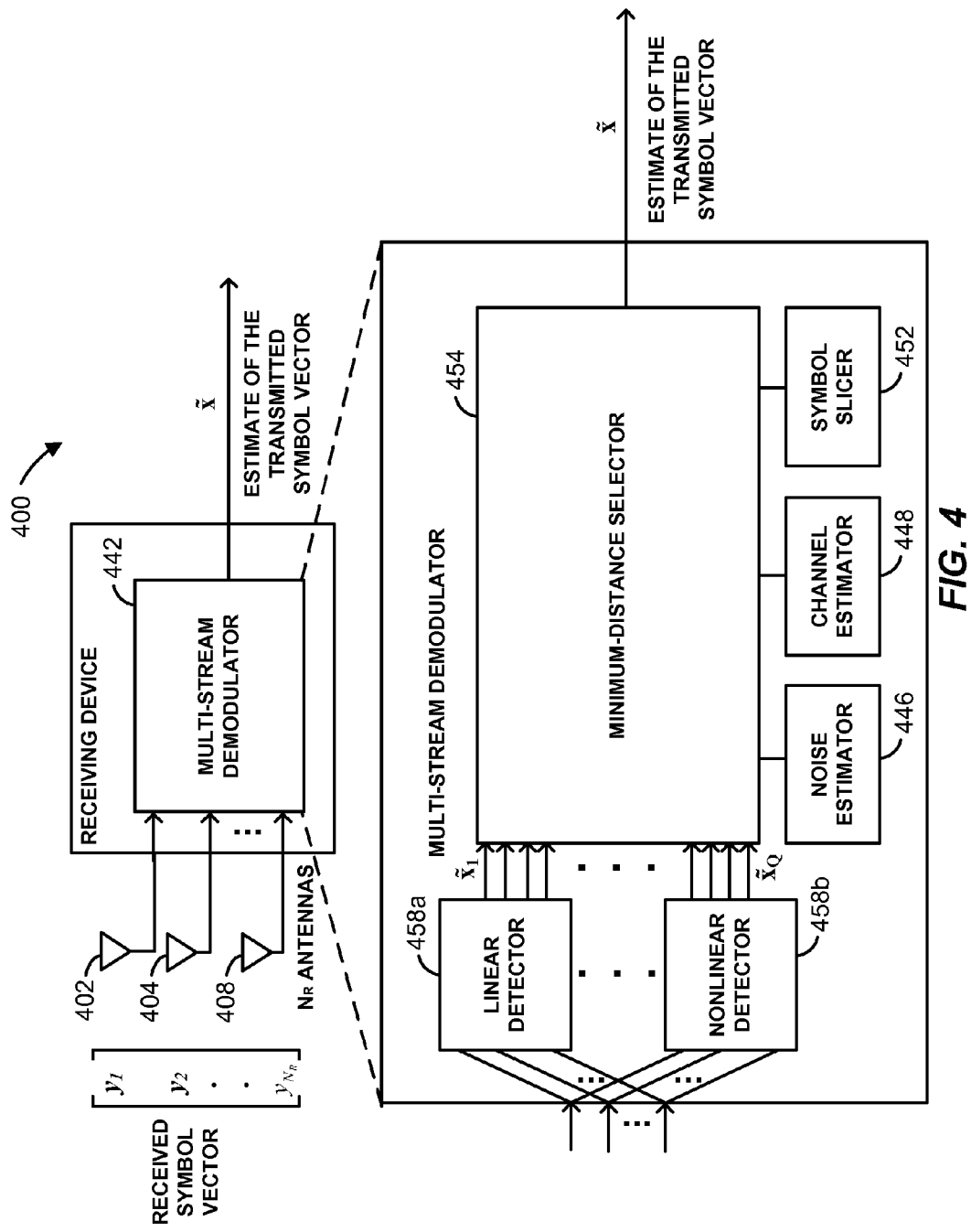
FIG. 4 is a block diagram of an example receiving device having multiple detectors and a minimum-distance selector.

FIG. 4 is a block diagram of an example receiving device 400 that demodulates and decodes signals from one or more transmitting devices using a multi-stream demodulation scheme. The receiving device 400 may be utilized in the wireless communication system 100 as the receiving device 106, for example. The receiving device 400 may receive and demodulate multiple streams transmitted by a device such as the transmitting device 200a of FIG. 2A or the transmitting device 200b of FIG. 2B or some other transmitting device.

Generally, the receiving device 400 may receive information via multiple receive antennas 402-408 and demodulate and decode the received information to estimate the information that was sent by a transmitting device. The receiving device 400 processes received information utilizing a model, such as:

$$y = Hx + z, \text{ where}$$

$$y = \begin{bmatrix} y_1 \\ y_2 \\ \vdots \\ y_{N_R} \end{bmatrix}; H = \begin{bmatrix} h_{1,1} & h_{1,2} & \ldots & h_{1,S} \\ h_{2,1} & h_{1,2} & \ldots & h_{2,S} \\ \vdots & \vdots & \vdots & \vdots \\ h_{N_R,1} & h_{N_R,2} & \ldots & h_{N_R,S} \end{bmatrix}; x = \begin{bmatrix} x_1 \\ x_2 \\ \vdots \\ x_S \end{bmatrix}; z = \begin{bmatrix} z_1 \\ z_2 \\ \vdots \\ z_{N_R} \end{bmatrix},$$

in which y represents, in vector from, a received signal, H represents a MIMO communication channel, x represents, in vector form, a transmitted signal, z represents a noise vector, and $N_R$ is the number of receive antennas. More precisely, $y_r$ is a received signal at antenna r, and $Z_r$ is noise at antenna r. Although $N_R$ is illustrated in FIG. 4 as being three, any number of multiple antennas may, in general, be utilized.

The MIMO communication channel H includes channel gain parameters $h_{r,s}$ representing channel gain in a stream s at a receive antenna r. In at least some of the embodiments, each channel gain parameter $h_{r,s}$ is a complex number that incorporates an amplitude factor and a phase shift factor. In other words, each $h_{r,s}$ parameter may represent an attenuation coefficient associated with a certain propagation path as used in, for example, a Rayleigh fading channel model. The receiving device 400 may estimate the parameters $h_{r,s}$, and parameters associated with the noise z using any suitable technique, including known techniques.

With continued reference to FIG. 4, the receiving device 400 includes a multi-stream demodulator 442 that may generate, based on the received symbols $y_1, y_2, \ldots, y_{N_R}$, estimates $\tilde{x}_1, \tilde{x}_2, \ldots, \tilde{x}_S$ (represented as $\tilde{x}$ in vector form) of the transmitted symbols $x_1, x_2, \ldots, x_S$. Generally speaking, in order to generate the estimate $\tilde{x}$ of the transmitted vector x, the multi-stream demodulator 442 may consider Q different candidate vectors $\tilde{x}_1, \tilde{x}_2, \ldots, \tilde{x}_Q$, where Q is less than the number of all possible candidate vectors for the transmitted vector x, and select one candidate vector $\tilde{x}$ that minimizes the probability of error with respect to the transmitted vector x. Because the multi-stream demodulator 442 outputs a vector $\tilde{x}$, and not likelihood values associated with the vector $\tilde{x}$, the multi-stream demodulator 442 is called a "hard" demodulator. By contrast, demodulators that output likelihood values associated the vector $\tilde{x}$ are called "soft-decision demodulators," or simply "soft demodulators."

As illustrated in FIG. 4, the multi-stream demodulator 442 includes various modules and/or components. In particular, the multi-stream demodulator 442 includes a minimum-distance selector 454 and one or more detectors 458. In general, the detectors 458 (or a single detector 458) generate Q different candidate vectors $\tilde{x}_1, \tilde{x}_2, \ldots, \tilde{x}_Q$, where Q is less than the number of all possible candidate vectors, and the minimum-distance selector 454 selects one candidate vector $\tilde{x}$ using, for example a maximum-likelihood technique, or using another minimum-distance criterion.

Each of the detectors 458 may comprise one of a variety of suitable detectors, including non-ML detectors, for example. In some embodiments, the detectors 458 may include linear detectors 458a, such as a simple Zero Forcing (ZF) Equalizer, a Minimum Mean Square Error (MMSE) detector, a Maximum-Ratio Combining (MRC) detector, and so on. Generally speaking, the linear detectors 458a may generate estimate $\tilde{x}$ of the transmitted vector x using an equation such as:

$$\tilde{x} = [\tilde{x}_1, \ldots, \tilde{x}_S]^T = dec(\bar{x}) = [dec(\bar{x}_1) \ldots dec(\bar{x}_S)]^T, \quad (1)$$

where $$\bar{x} = Gy, \; dec(\bar{x}_s) = \underset{x \in \Omega}{\operatorname{argmin}} |x - \bar{x}_s|, s = 1, \ldots, S,$$

where $\Omega$ is the set of constellation points, and where G may be different for different types of linear detectors. For example, $G=(H^H H)^{-1} H^H$ in the case of a zero-forcing detector; $G=(H^H H + \sigma_z^2 I)^{-1} H^H$, where I is an identity matrix and $\sigma_z^2$ is the noise power, in the case of an MMSE detector; and $G=H^H (\text{diag}(H^H H))^{-1}$, where diag(A) is matrix A with zero non-diagonals, in the case of an MRC detector.

In addition to, or instead of linear detectors, the detectors 458 illustrated in FIG. 4 may include non-linear detectors 458b, such as Ordered Serial Interference Cancellers (OSIC), K-Best detectors, etc. It will be understood that the possible detectors recited above are mentioned only as examples, and that the multi-stream demodulator 442 is not limited to any particular detectors, or to any particular type of detectors. It will be further understood that although FIG. 4 illustrates one linear detector 458a and one nonlinear detector, the multi-stream demodulator 454 may include any combination of linear and nonlinear detectors. For example, the multi-stream demodulator 442 may include only linear detectors 458a, only nonlinear detectors 458b, an equal number of linear and non-linear detectors 458, an unequal number of linear and non-linear detectors 458 and so on. Still further, it will be understood that each detector 458 may generate 1, 2, or more of the Q candidate vectors $\tilde{x}_1, \tilde{x}_2, \ldots, \tilde{x}_Q$, and different detectors 458 may generate a different number of candidate vectors.

As described above, the Q candidate vectors $\tilde{x}_1, \tilde{x}_2, \ldots, \tilde{x}_Q$, generated by the detectors 458 may be used by the minimum-distance selector 454. The minimum-distance selector 454 selects one candidate vector $\tilde{x}$ from the Q candidate vectors $\tilde{x}_1, \tilde{x}_2, \ldots, \tilde{x}_Q$, using, for example, a maximum-likelihood technique, or using another minimum-distance criterion. In particular, the minimum-distance selector 454 may select the candidate vector $\tilde{x}$ that minimizes a distance value corresponding to the Euclidean distance between the received data symbol vector y and a channel matrix H multiplied with the candidate vector x. That is, the minimum-distance selector 454 may select the candidate vector using an equation, such as:

$$\tilde{x} = \operatorname*{argmin}_{x \in \tilde{x}_1, \tilde{x}_2, \ldots, \tilde{x}_Q} \|y - Hx\| \qquad (2)$$

It should be noted that unlike conventional maximum-likelihood (ML) detectors, the minimum-distance selector 454 illustrated in FIG. 4 does not consider all possible candidate vectors in determining $\tilde{x}$. Instead, the minimum-distance selector 454 considers only a subset of all possible candidate vectors that is generated by the detectors 458. Because the detectors 458 effectively eliminate certain candidate vectors from consideration, they reduce the complexity of the maximum likelihood technique at the cost of little or no performance degradation. As a result, the receiving device 400 may be able to demodulate and decode signals faster, with fewer and/or less costly processing components, and so on.

The multi-stream demodulator 442, in some embodiments, or in some modes of operation, may include additional modules and/or components. For example, the multi-stream demodulator 442 may include a symbol slicer 452 that performs suitable symbol slicing operations (e.g., QAM slicing), including known symbol slicing operations. The multi-stream demodulator 442 may also include a channel estimator 448 to estimate the MIMO communication channel H and a noise estimator 446 for generating noise estimate information, including, for example, the variance of the noise $\sigma_z^2$. Moreover, the multi-stream demodulator 442, in some embodiments, or in some modes of operation, may not include one or more of the modules illustrated in FIG. 4 or, alternatively, may not use each of the modules in demodulating the received signals. Further, it will be appreciated that some of the modules illustrated in FIG. 4 may be combined. Still further, the multi-stream demodulator 442 and/or the receiving device 400 may include additional components and/or modules that, for clarity, are not shown in FIG. 4. For example, the receiving device 400 may include a deinterleaver that rearranges scattered bits and restores the proper bit sequence, an analog RF front end that performs frequency downconversion, various filters, power amplifiers, and so on.

Different components and/or modules of the receiving device 400 may be implemented as hardware, a processor executing software instructions, a processor implementing firmware instructions, or some combination thereof. For example, some or all of the components may be implemented on one or more custom integrated circuits, application-specific integration circuits (ASICs), etc. In this case, the receiving device 400 optionally may include bypass busses (not shown) to bypass some of the components if the currently active MIMO mode does not require certain operations, such as processing multiple presentations of a symbol encoded according to a space-time encoding scheme.

Figure 5:
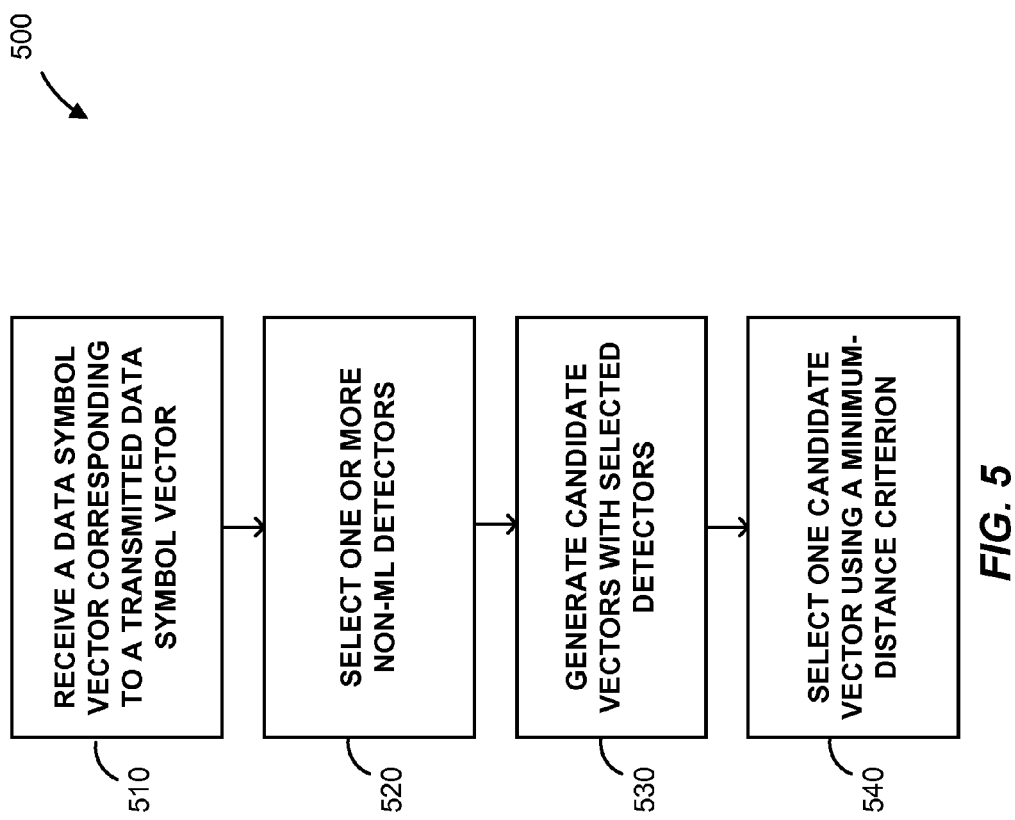
FIG. 5 is a flow diagram of an example multi-stream demodulation method.

FIG. 5 is a flow diagram illustrating an example multi-stream method 500 for demodulating a received data symbol vector using multiple detectors. For ease of explanation, FIG. 5 will be described with reference to FIG. 4. It will be understood, however, that the method 500 for demodulating and decoding a received data symbol vector y and estimating the corresponding transmitted data symbol vector x using multiple detectors may be utilized with systems and devices other than those illustrated in FIG. 4.

Referring to FIG. 5, when a receiving device (such as the receiving device 400 illustrated in FIG. 4) receives a data symbol vector y (block 510) including S symbols (where the symbols may be received at substantially the same time via separate spatial streams, for example), the receiving device may select one or more detectors (such as detectors 458 illustrated in FIG. 4) to generate 1, 2, or more of the Q candidate vectors $\tilde{x}_1, \tilde{x}_2, \ldots, \tilde{x}_Q$ for the transmitted data symbol vector x (block 520). The selection of suitable detectors may be performed in a variety of ways. Generally speaking, the detectors may be selected in such a way as to minimize computational complexity and/or maximize accuracy, for example. The selection of detectors may depend on a number of operational parameters and conditions, such as spatial interference associated with the channel H, presence of error propagation, signal-to-noise ratio (SNR) and so on. For example, an OSIC detector may generally perform better than linear detectors in the absence of error propagation, while linear detectors may be preferable otherwise. However, it should be understood that conditions such as error propagation may be difficult to determine, or predetermine, so other criteria for detector selection may be used. Furthermore, it should be understood that because conditions may change with time, different detectors may be selected by the same multi-stream demodulator at different points in time. It should also be noted that the selection of detectors (block 520) may be omitted altogether, and the multi-stream demodulator my use all available detectors.

After one or more detectors are selected (if detector selection is utilized), the selected detectors may be used to generate Q candidate vectors $\tilde{x}_1, \tilde{x}_2, \ldots, \tilde{x}_Q$ for the transmitted data symbol vector x (block 530). A given detector can generate more than one candidate vector. For example, an OSIC detector may generate multiple candidate vectors, each of which may be a different vector according to different ordering of symbols. For example, in a MIMO system with three receive antennas and three transmit antennas (such as the system illustrated in FIG. 1), an OSIC detector may generate six candidate vectors that include different orderings of the same three symbols.

After Q candidate vectors $\tilde{x}_1, \tilde{x}_2, \ldots, \tilde{x}_Q$ are generated (block 530), a minimum-distance selector may be used to select one candidate vector $\tilde{x}$ which has minimum distance as (2) from the Q candidate vectors $\tilde{x}_1, \tilde{x}_2, \ldots, \tilde{x}_Q$, using a maximum-likelihood technique, or using another minimum-distance criterion (block 540). The minimum-distance selector may use a variety of suitable maximum likelihood techniques to select the "best" candidate vector $\tilde{x}$ from the Q candidate vectors $\tilde{x}_1, \tilde{x}_2, \ldots, \tilde{x}_Q$, including those known in the art. The "best" candidate vector $\tilde{x}$ may be, for example, the vector $\tilde{x}$ that most closely resembles (or has the highest probability of most closely resembling) the transmitted vector x. It should be noted that the "best" candidate vector $\tilde{x}$ is not necessarily associated with any particular detector or group of detectors. In fact, as conditions change, the "best" candidate vectors x̃ may be chosen by the same multi-steam demodulator from different detectors at different times.

The method 500 for demodulating and decoding a received data symbol vector using multiple detectors described in reference to FIG. 5 may be used alone, or in combination with other demodulation and decoding techniques. For example, the method 500 for demodulating and decoding a received data symbol vector using multiple detectors may be used in combination with a soft ML demodulation technique. For example, the method 500 for demodulating and decoding a received data symbol vector using multiple detectors may be used with modulation techniques described in the U.S. patent application Ser. No. 12/469,382, entitled "MULTI-STREAM SOFT DEMODULATION USING HARD DECISION SCHEMES," filed on May 20, 2009, the disclosure of which is hereby expressly incorporated herein by reference.

Figure 6:
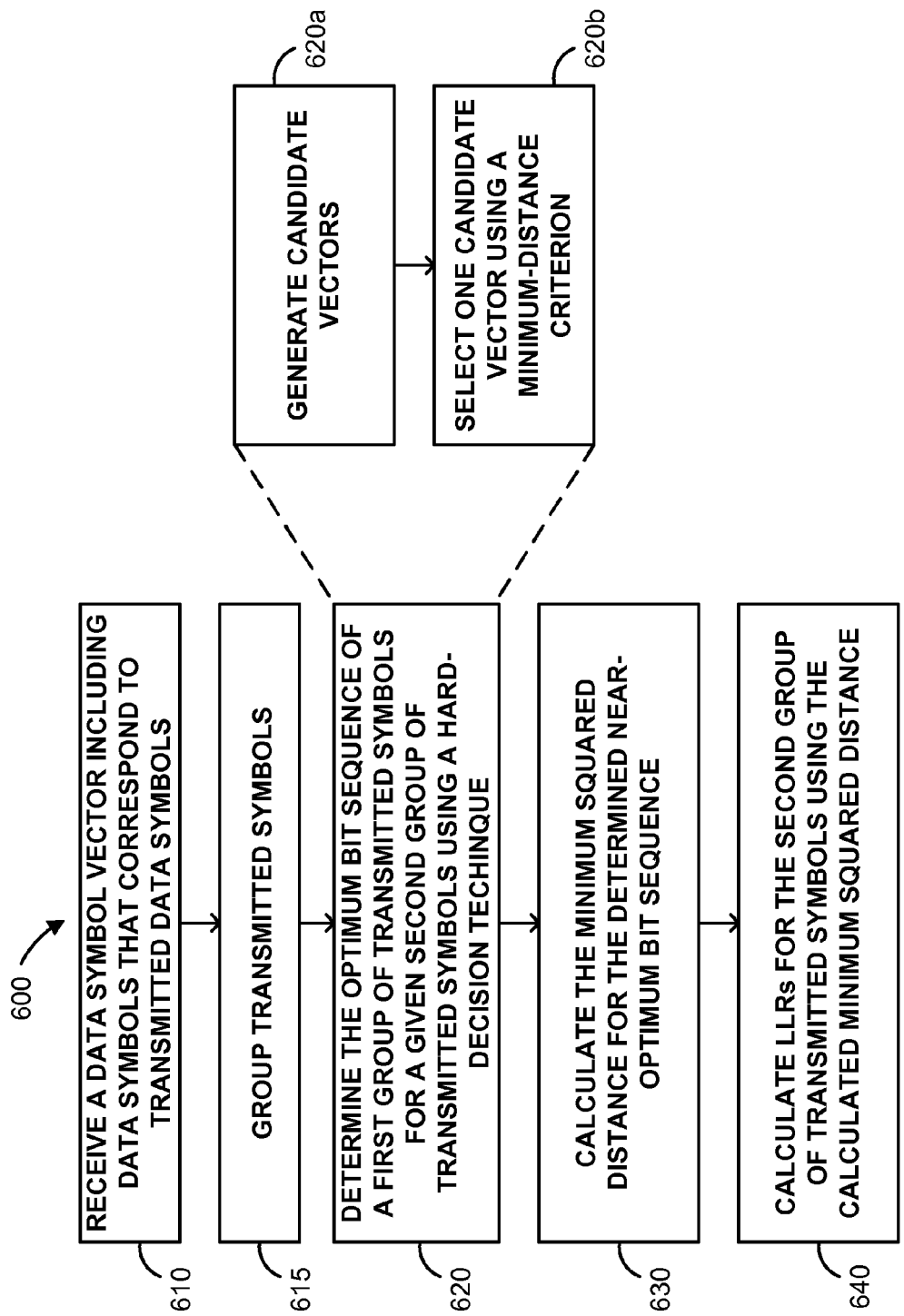
FIG. 6 is a flow diagram of an example multi-stream demodulation method that uses hard and soft demodulation techniques.

FIG. 6 is a flow diagram illustrating an example multi-stream method 600 for demodulating and decoding a received data symbol vector using a combination of hard and soft demodulation schemes and using multiple detectors. For ease of explanation, FIG. 6 will be described with reference to FIG. 4. It will be understood, however, that the method 600 for demodulating and decoding a received data symbol vector using a combination of hard and soft demodulation schemes and using multiple detectors may be utilized with systems and devices other than those illustrated in FIG. 4.

Referring to FIG. 6, when a receiving device (such as the receiving device 400 illustrated in FIG. 4) receives a data symbol vector y (block 610) including S symbols (where the symbols may be received at substantially the same time via multiple spatial streams, for example), the receiving device may group the transmitted data symbols $x_s$ (block 615), e.g., into one group $(x_1, \ldots, x_K)$ and another group $(x_{K+1}, \ldots, x_S)$. The receiving device may then determine the optimum, or near-optimum vector $$\begin{bmatrix} \hat{x}_1 \\ \vdots \\ \hat{x}_K \end{bmatrix}$$

that substantially minimizes the squared distance $\|y-Hx\|^2$ for a given $x_{K+1}, \ldots, x_S$ (block 620). The optimum (or near-optimum) vector $$\begin{bmatrix} \hat{x}_1 \\ \vdots \\ \hat{x}_K \end{bmatrix}$$

may be determined using a hard-deciding technique, such as the multi-stream method 500 for demodulating and decoding a received data symbol vector using multiple detectors described in reference to FIG. 5. In particular, one or more detectors (or a single detector) may generate Q different candidate vectors $\tilde{x}_1, \tilde{x}_2, \ldots, \tilde{x}_Q$ for the vector $$\begin{bmatrix} \hat{x}_1 \\ \vdots \\ \hat{x}_K \end{bmatrix}$$

(block 620a), and a minimum-distance selector may select one candidate vector X as an optimum, or near-optimum vector $$\begin{bmatrix} \hat{x}_1 \\ \vdots \\ \hat{x}_K \end{bmatrix}$$

using a maximum-likelihood technique, or using another minimum-distance criterion (block 620b).

After determining the optimum, or near-optimum vector $$\begin{bmatrix} \hat{x}_1 \\ \vdots \\ \hat{x}_K \end{bmatrix}$$

that substantially minimizes the squared distance $\|y-Hx\|^2$ for a given $x_{K+1}, \ldots, x_S$ (block 620), the receiving device may use the vector $$\begin{bmatrix} \hat{x}_1 \\ \vdots \\ \hat{x}_K \end{bmatrix}$$

to calculate the minimum squared distance $$\min_{\hat{x}_1, \ldots, \hat{x}_K, x_{K+1}, \ldots, x_S} \|y - Hx\|^2$$

for that vector $$\begin{bmatrix} \hat{x}_1 \\ \vdots \\ \hat{x}_K \end{bmatrix}$$

(block 630) for the given $x_{K+1}, \ldots, x_S$. After computing the distance for all the candidate values of $x_{K+1}, \ldots, x_S$, the receiving device may use this calculated squared distance to calculate log-likelihood ratios (LLRs) for $x_{K+1}, \ldots x_S$ (block 640), e.g., using techniques described in the U.S. patent application Ser. No. 12/469,382, entitled "MULTI-STREAM SOFT DEMODULATION USING HARD DECISION SCHEMES," filed on May 20, 2009.

Example multi-stream demodulation and decoding techniques that use multiple detectors have been described above, but other implementations are also possible. For example, the multi-stream demodulation and decoding techniques have been described in reference to a wireless communication model where y=Hx+z. However, multi-stream demodulation and decoding techniques that use multiple detectors may be used with systems using other communication models. As one example, a receiving device may use the described multi-stream demodulation and decoding techniques in conjunction with techniques for QR decomposition of matrix H, such as known QR decomposition techniques. Such a receiving device could use the following model for example:

$$\tilde{y}=Q^*y=Q^*Hx+Q^*z=Rx+\tilde{z} \quad (3)$$

where * denotes a complex conjugate.

The model (3) has a similar form as the y=Hx+z model, except that the matrix R is an upper triangular matrix. Q matrix is a unitary matrix and the R matrix may be represented as $$R = \begin{bmatrix} r_{11} & r_{12} \\ 0 & r_{22} \end{bmatrix}.$$

This feature of the matrix R may further lower the complexity of the multi-stream ML demodulation techniques described above because computations at the elements of zero in R are not required. Similar to a QR decomposition technique, other linear processing techniques may be applied to y.

At least some of the various blocks, operations, and techniques described above may be implemented using hardware, a processor executing firmware instructions, a processor executing software instructions, or any combination thereof. When implemented using a processor executing firmware or software instructions, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method of demodulating a signal transmitted via a multiple input multiple output (MIMO) communication channel, the method comprising:

receiving a data symbol vector comprising a plurality of data symbols that are received via a plurality of antennas, wherein the received data symbol vector corresponds to a transmitted data symbol vector comprising a plurality of transmitted data symbols;

generating a plurality of candidate vectors for the transmitted data symbol vector, wherein the plurality of candidate vectors are less than all possible vectors for the transmitted data symbol vector; and selecting one candidate vector from the plurality of candidate vectors such that the one candidate vector minimizes a distance value corresponding to a Euclidean distance between the received data symbol vector and a channel estimate matrix multiplied with the candidate vector.

2. The method of claim 1, wherein generating the plurality of candidate vectors comprises using at least one linear non-ML technique to generate at least one of the plurality of candidate vectors.

3. The method of claim 2, wherein the at least one linear non-ML technique is at least one technique selected from a group comprising Zero Forcing (ZF), Minimum Mean Square Error (MMSE) estimation, and Maximum-Ratio Combining (MRC).

4. The method of claim 2, wherein one of the at least one linear non-ML technique generates two or more of the plurality of candidate vectors.

5. The method of claim 2, wherein generating the plurality of candidate vectors further comprises using at least one nonlinear non-ML technique to generate at least another one of the plurality of candidate vectors.

6. The method of claim 1, wherein generating the plurality of candidate vectors comprises using at least one nonlinear non-ML technique to generate at least one of the plurality of candidate vectors.

7. The method of claim 6, wherein the at least one nonlinear non-ML technique is at least one technique selected from a group comprising Ordered Serial Interference Cancellation (OSIC) and K-Best technique.

8. The method of claim 6, wherein one of the at least one nonlinear non-ML technique generates two or more of the plurality of candidate vectors.

9. A method of demodulating a signal transmitted via a multiple input multiple output (MIMO) communication channel, the method comprising:

receiving a data symbol vector y comprising a plurality of data symbols that are received via a plurality of antennas, wherein the received data symbol vector y corresponds to a transmitted data symbol vector x comprising a plurality of transmitted data symbols;

generating a plurality of candidate vectors for a first group of data symbols in the transmitted data symbol vector, wherein the plurality of candidate vectors are less than all possible vectors for the first group of data symbols in the transmitted data symbol vector;

selecting one candidate vector from the plurality of candidate vectors such that the one candidate vector minimizes a distance value corresponding to a Euclidean distance between the received data symbol vector y and a channel estimate matrix multiplied with the candidate vector;

calculating likelihood values for data symbols in a second group of transmitted data symbols in the transmitted data symbol vector using a soft maximum-likelihood (ML) technique based on the selected candidate vector, wherein the first group does not overlap with the second group.

10. The method of claim 9, wherein generating the plurality of candidate vectors comprises using at least one linear non-ML technique to generate at least one of the plurality of candidate vectors.

11. The method of claim 10, wherein the at least one linear non-ML technique is at least one technique selected from a group comprising Zero Forcing (ZF), Minimum Mean Square Error (MMSE) estimation, and Maximum-Ratio Combining (MRC).

12. The method of claim 10, wherein one of the at least one linear non-ML technique generates two or more of the plurality of candidate vectors.

13. The method of claim 10, wherein generating the plurality of candidate vectors further comprises using at least one nonlinear non-ML technique to generate at least another one of the plurality of candidate vectors.

14. The method of claim 9, wherein generating the plurality of candidate vectors comprises using at least one nonlinear non-ML technique to generate at least one of the plurality of candidate vectors.

15. The method of claim 14, wherein the at least one nonlinear non-ML technique is at least one technique selected from a group comprising Ordered Serial Interference Cancellation (OSIC) and K-Best technique.

16. The method of claim 14, wherein one of the at least one nonlinear non-ML technique generates two or more of the plurality of candidate vectors.

17. A device for demodulating a signal transmitted via a multiple input multiple output (MIMO) communication channel, comprising:
 a multi-stream demodulator configured to demodulate a received data symbol vector comprising a plurality of data symbols received via a plurality of antennas, wherein the received data symbol vector corresponds to a transmitted data symbol vector, and wherein the multi-stream demodulator includes
  at least one detector configured to generate a plurality of candidate vectors for the transmitted data symbol vector, wherein the plurality of candidate vectors are less than all possible vectors for the transmitted data symbol vector, and
  a minimum-distance selector configured to select one candidate vector from the plurality of candidate vectors such that the one candidate vector minimizes a distance value corresponding to a Euclidean distance between the received data symbol vector and a channel estimate matrix multiplied with the candidate vector.

18. The device of claim 17, wherein the at least one detector configured to generate a plurality of candidate vectors comprises a linear detector configured to generate at least one of the plurality of candidate vectors.

19. The device of claim 18, wherein the linear detector is selected from a group comprising a Zero Forcing (ZF) detector, a Minimum Mean Square Error (MMSE) detector, and a Maximum-Ratio Combining (MRC) detector.

20. The device of claim 18, wherein the at least one detector configured to generate a plurality of candidate vectors comprises a nonlinear detector configured to generate at least another one of the plurality of candidate vectors.

21. The device of claim 17, wherein the at least one detector configured to generate a plurality of candidate vectors comprises a nonlinear detector configured to generate at least one of the plurality of candidate vectors.

22. The device of claim 21, wherein the nonlinear detector is selected from a group comprising an Ordered Serial Interference Cancellation (OSIC) detector and a K-Best detector.

23. A device for demodulating a signal transmitted via a multiple input multiple output (MIMO) communication channel, comprising:
 a multi-stream demodulator configured to demodulate a received data symbol vector comprising a plurality of data symbols received via a plurality of antennas, wherein the received data symbol vector corresponds to a transmitted data symbol vector, and wherein the multi-stream demodulator includes
  at least one detector configured to generate a plurality of candidate vectors for a first group of data symbols in the transmitted data symbol vector, wherein the plurality of candidate vectors are less than all possible vectors for the first group of data symbols in the transmitted data symbol vector, and
  a minimum-distance selector configured to select one candidate vector from the plurality of candidate vectors such that the one candidate vector minimizes a distance value corresponding to a Euclidean distance between the received data symbol vector and a channel estimate matrix multiplied with the candidate vector;
 wherein the multi-stream demodulator is configured to calculate likelihood values for data symbols in a second group of transmitted data symbols in the transmitted data symbol vector using a soft maximum-likelihood (ML) technique based on the selected candidate vector, wherein the first group does not overlap with the second group.

24. The device of claim 23, wherein the at least one detector configured to generate a plurality of candidate vectors comprises a linear detector configured to generate at least one of the plurality of candidate vectors.

25. The device of claim 24, wherein the linear detector is selected from a group comprising a Zero Forcing (ZF) detector, a Minimum Mean Square Error (MMSE) detector, and a Maximum-Ratio Combining (MRC) detector.

26. The device of claim 24, wherein the at least one detector configured to generate a plurality of candidate vectors comprises a nonlinear detector configured to generate at least another one of the plurality of candidate vectors.

27. The device of claim 23, wherein the at least one detector configured to generate a plurality of candidate vectors comprises a nonlinear detector configured to generate at least one of the plurality of candidate vectors.

28. The device of claim 27, wherein the nonlinear detector is selected from a group comprising an Ordered Serial Interference Cancellation (OSIC) detector and a K-Best detector.

* * * * *